United States Patent [19]

Rodriguez

[11] Patent Number: 4,554,736
[45] Date of Patent: Nov. 26, 1985

[54] NUTCRACKER

[76] Inventor: David F. Rodriguez, 7537 Paddon Rd., Vacaville, Calif. 95688

[21] Appl. No.: 446,558

[22] Filed: Dec. 3, 1982

[51] Int. Cl.[4] .......................... A23N 5/00; A47J 43/26
[52] U.S. Cl. ...................................... 30/120.3; 99/571
[58] Field of Search ................ 30/120.2, 120.3, 120.4, 30/120.5; 99/571, 581, 582

[56] References Cited

U.S. PATENT DOCUMENTS

| | | | |
|---|---|---|---|
| 1,123,852 | 1/1915 | Costa | 30/120.3 |
| 1,192,846 | 8/1916 | Boyer | 30/120.5 |
| 1,598,490 | 8/1926 | Miller | 30/120.3 |
| 2,426,120 | 8/1947 | Posey | 99/581 X |
| 4,009,651 | 3/1977 | Adams | 30/120.3 |
| 4,200,042 | 4/1980 | Scholz | 99/571 X |
| 4,255,855 | 3/1981 | Brazil | 30/120.2 |

FOREIGN PATENT DOCUMENTS

| | | | |
|---|---|---|---|
| 2390929 | 12/1978 | France | 30/120.3 |
| 12005 | of 1889 | United Kingdom | 30/120.3 |
| 735108 | 8/1955 | United Kingdom | 30/120.3 |

*Primary Examiner*—Jimmy C. Peters
*Attorney, Agent, or Firm*—Mark C. Jacobs

[57] ABSTRACT

A nutcracker that includes a pivoted arm for cracking the nuts, a channel to both hold the nut for cracking and to reduce shell scatter, the movement of the pivoting arm being limited by a stop which prevents damage to the nut meat.

10 Claims, 5 Drawing Figures

NUTCRACKER

BACKGROUND OF THE INVENTION

This invention pertains to a new and improved device for the cracking of nuts and more particularly to a nutcracker which deters shell scatter. The nutcracker can be actuated by anyone from age 4 to 104 with little mechanical skill. It is easy to operate and it reduces shell scatter by confining the cracked shell portions in a channel defined by a pair of parallel rods used to hold the nut.

DESCRIPTION OF THE PRIOR ART

Nutcracking is well known having been in use even before America was founded. Patents that made cracking easier than using a hammer as was done in the olden days are many in number. One of the earliest known to applicant is the unit disclosed in the Kerr U.S. Pat. No. 870,441 issued in 1907. Another is that of Costa U.S. Pat. No. 1,123,852 issued in 1915 and yet another is Boyer U.S. Pat. No. 1,192,846 issued in 1916.

Even in recent years improvements in nutcrackers are found in the patent literature. Reference is made to Adams, U.S. Pat. No. 4,009,651 issued in 1977 and the Brazil Pat. No. 4,255,855 issued in 1981.

Accordingly it is an object of this invention to provide an improved nutcracker which is portable and does not require mounting to use.

Another object is to provide a cracker that reduces shell scatter by confining the shell segments.

Still another object is to provide a cracker that prevents damage to the nutmeat subsequent to impact.

Yet another object is to provide a cracker that can be used with substantially any size nut by substantially any size person for extended periods of time without undue hand strain.

These and other objects will in part be obvious and will in part be discernible from a reading of the attached specification taken in connection with the drawings and the appended claims.

SUMMARY OF THE INVENTION

The objects of the invention are accomplished by providing a weighted pivotable arm whose travel is impeded by a stop, but which arm during its travel can crush the shell of a nut confined within a nut receiving channel.

DESCRIPTION OF THE PREFERRED EMBODIMENT

Figure 1:
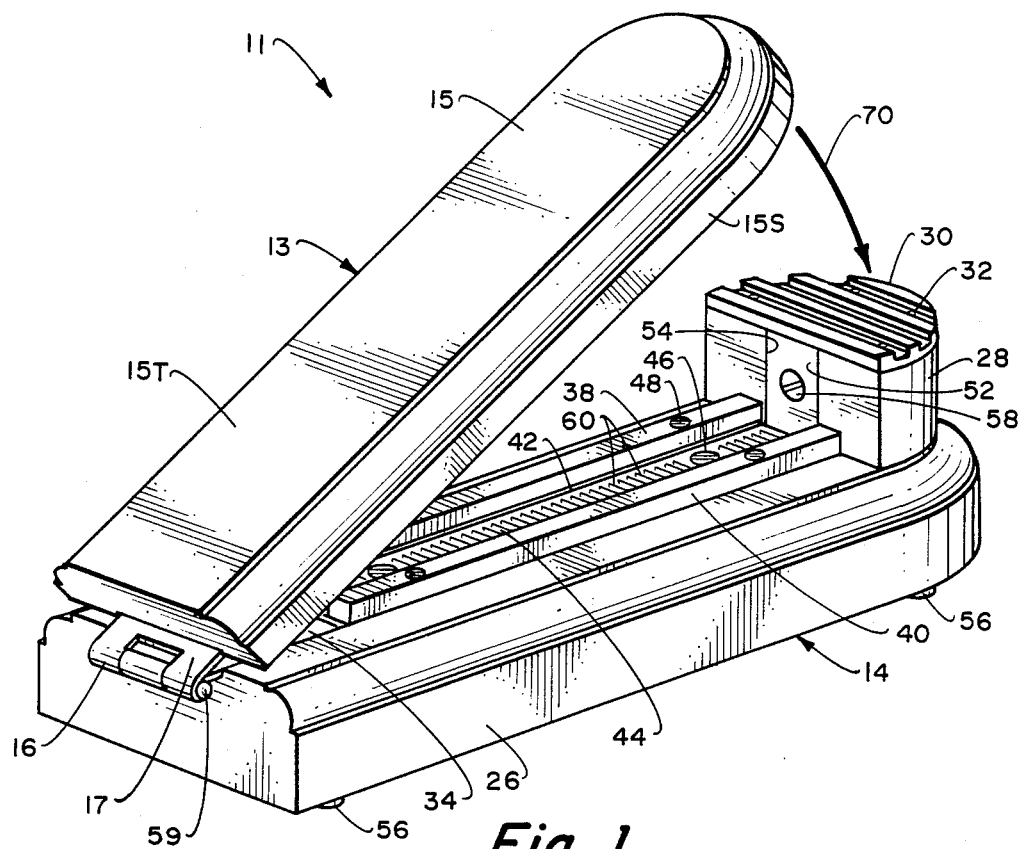
FIG. 1 is a rear perspective view of the device of this invention.
Figure 4:
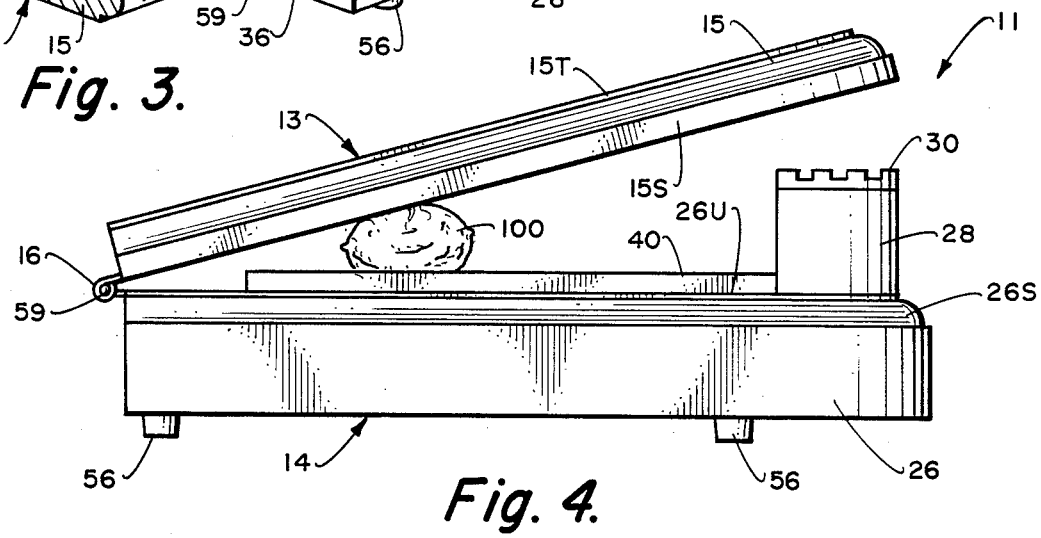
FIG. 4 shows the device of this invention in operation cracking a walnut.
Figure 5:
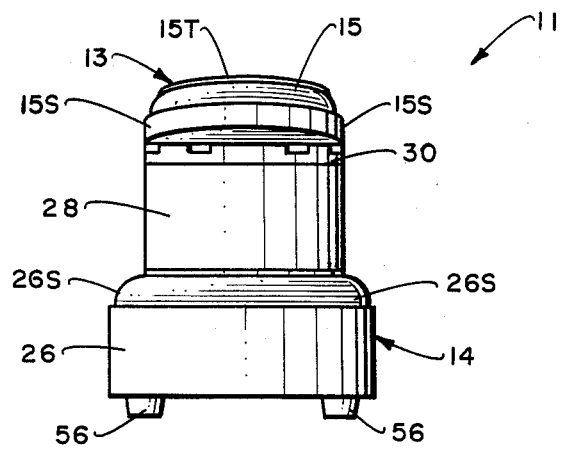
FIG. 5 is a front elevational view of this invention.

The nutcracker of this invention designated 11 is seen in its entirety in both FIGS. 1 and 4. Turning first to FIG. 1 it is seen that device 11 includes an upper part 13 hingedly connected by hinge 16 to the bottom half 17.

Figure 2:
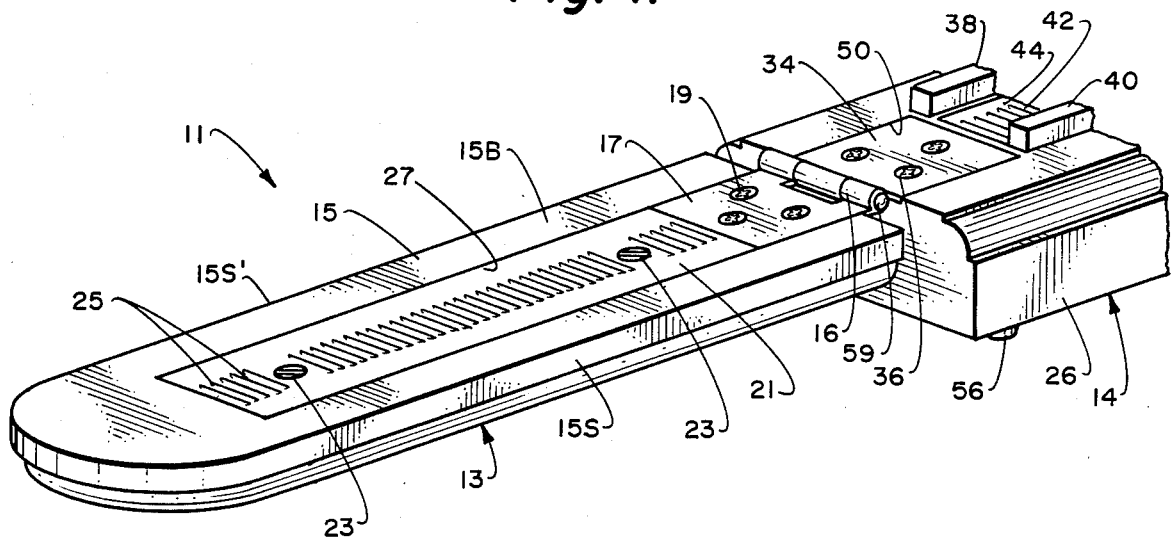
FIG. 2 is a bottom plan view of the impact arm forming the top part of this invention.

In FIG. 2 the details of the top part 13 are shown. Top part 13 includes a generally rectangular weighted arm 15 which for aesthetics may be chamfered at the front end thereof as shown here to provide a more pleasing looking but similarly operated device. Arm 15 includes a top surface 15T, two sides 15S and 15S' and a bottom surface 15B, as well as unnumbered front and rear surface. Centrally disposed along the length thereof is a recess about $\frac{1}{8}$ inch in depth 27 which is adapted to receive the top half of hinge 16 designated 17, and impact plate 21.

The impact plate 21 is held in place by wood screws 23, while the hinge half 17 is retained by screws 19. Impact plate 21, usually of a metal such as steel or aluminum includes a series of notches defined transverse to the length of the plate, said notches being numbered 25. These notches prevent the nut 100 (FIG. 4) from sliding out of position.

Figure 3:
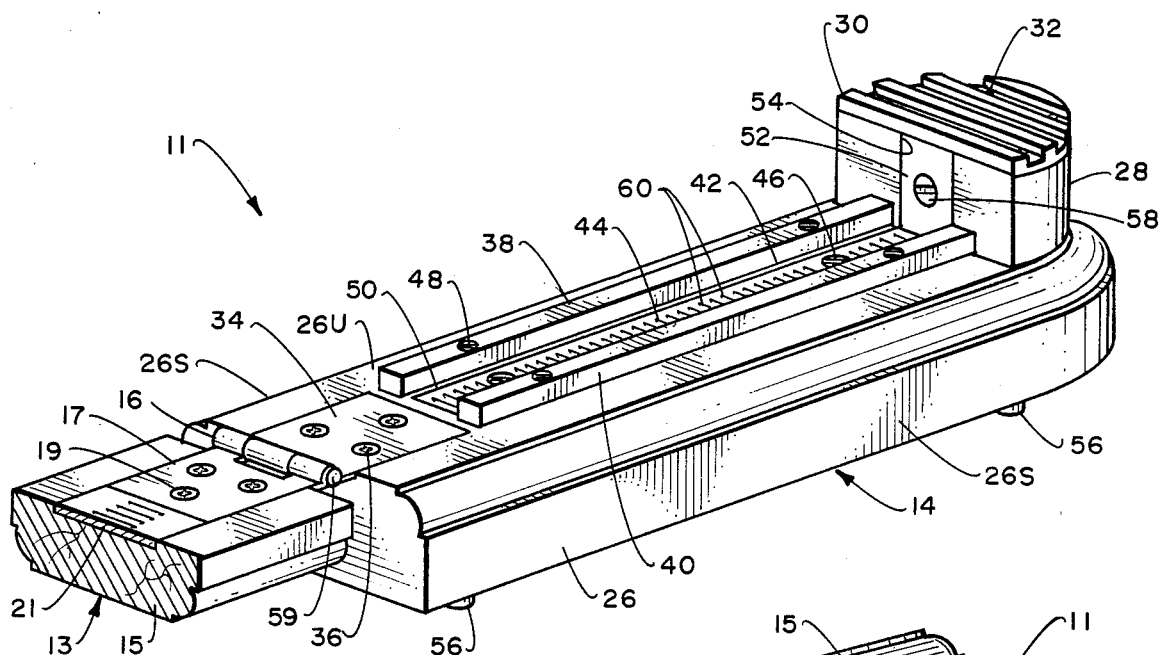
FIG. 3 is a top perspective view of the bottom part of this invention, and a portion of the top part as well.

The bottom half or bottom part 14 of the device 11 best seen in FIG. 3 includes a base 26 which rests upon a plurality of rubber feet 56 shown in FIG. 4. No criticality is attached to the rubber feet which are suitably conventionally attached, as any rest such as a rubber mat will perform the same function; namely to prevent slippage on a table top.

Base 26 is a generally rectangular member here having chamfered front corners to present a more pleasing looking device. Base 26 includes a bottom surface, not seen, side surfaces 26S and 26S' and an upper surface 26U, as well as unnumbered front and rear surfaces. Base 26 may as with top part 13 be made of wood such as mahogany or metal.

Base 26 includes an upstanding stop 28 disposed at the forward end thereof. The stop can be rectangular, square, hemispherical or any other convenient shape. For asthetic purposes a semi-circular cross-section member is suggested to conform to the chamfered front configuration of the base 26. Stop 28 may be attached as by glue or nails not seen to the upper surface 26U of base 26.

Mounted on top of stop 28 is shock absorber pad 30, of similar configuration in cross-section, but only of about $\frac{1}{4}''$ in elevation. Shock pad 30 is secured to the stop 28 by brads 32.

Disposed directly rearwardly of stop 28 on base 26 are a pair of rearwardly extending, spaced parallel rails 38, 40. These may be square or round but square are easier to secure to the base, Rails 38,40 may be solid or rod like and hollow. A typical size is $\frac{1}{4}'' \times \frac{1}{4}''$ by about 6'' long. They are spaced about 1'' to $1\frac{1}{2}''$ between inside edges. They may be secured to base 26 by a series of spaced flush mounted screw 48.

Elongated recess 50 extends from the rear of stop 28 to the back edge of the top surface of base 26. The recess is configured to tightly receive the nuts receiver plate 44 and the bottom hinge half. The plate 44 and hinge half 34 are sized taken together in length to equal the length of recess 50 and widthwise to be slightly narrower than recess 50 to frictionally fit therein. Here the recess is somewhat T-shaped, but it can be merely an elongated recess, the actual configuration being keyed to the width of the hinge which is of course not critical.

Here the nut receiver plate 44 which is secured by screws 46 is spaced inwardly from each of the rails 38, 40 though a flush fit is also contemplated. A defined channel 42 is formed of a generally U-shaped configuration consisting of a portion of the upper surface 26U of base 26, the nut receiver plate 44, and the spaced parallel rails 38, 40 for holding the nut and confining the cracked shell after use of the instant device.

Hinge half 34 is secured into recess 50 by screws 36 and is disposed at the opposite end of said base as is said stop.

Optionally there may be included an elongated recess 54 that extends upwardly from the base 26 along the elevation of stop 28. A reinforcing plate 52 is frictionally received in said recess 54 and secured by a screw 58.

The top 13 and bottom 14 parts, are joined by the hinge halves at hinge pin 59.

Obviously it is seen that arm 15 must extend forwardly enough to come to rest in its downward travel on shock absorber 30 and not the rails.

When the shock absorber 30 is placed in a true horizontal disposition, there may be a tendency for the shock absorber 30 to wear down unevenly from constantly being impacted by arm 15. The analogy is drawn to the wearing down of a shoe heel from uneven pressure. Here the uneven pressure is due to the angularity of impact of the arm 15, which is readily seen from a viewing of FIG. 4. The uneven wearing down of pad 30 can be reduced by inclining the top surface of stop 28 before attaching the shock absorber pad 30, said inclination to be from about 0°-10° rearwardly downward.

Obviously in the alternative the stop 38 can have a generally horizontal top surface, while the shock absorber pad 30 instead of being of uniform thickness as shown, is made thicker in front than in the back to achieve the same inclined result for the top surface. However, the first discussed mode is preferred due to easier construction.

No matter which mode is used to achieve the inclination of the pad 30's top surface, 8° of inclination is the preferred angle.

OPERATION

A nut 100 is placed into the defined channel 42 and is prevented from sliding by the scoring notches 60 which are scratched about 1/32 of an inch deep into plate 44. These notches are a series of parallel scores transverse to the length of the nut receiver plate 44. The arm 15 is raised as is shown in FIG. 1 by the operator. The arm is then either carried downwardly by holding the arm 15 and moving the operator's hand to achieve a downward arcing stroke, or the nut 100 may be placed in channel 42 so that the upper arm 13 rests about ¼" above stop 28 when resting on the nut. A sharp blow to the arm 13 directly above stop 28 will then crack the nut. Impact plate 21 also includes a series of transverse notches to inhibit the nut 100 from moving about in the defined channel 42.

The laws for the placement of the nut 100 is related to the size of the nut. The smaller the nut the more rearwardly it is to be placed in the device. This is because the arm's 15 traverse is limited by stop 28, and specifically by the shock absorber pad 30, which may be made of rubber or plastic. By preventing the full impact of the arm 15, only the shell of nut 100 is cracked, while the meat inside is left undamaged. The rails 38, 40 tend to confine shell scatter such that the shell segments remain either within the defined channel or closeby for easy cleanup.

The arc movement is shown by arrow 70 in FIG. 1. Reference to FIG. 4 shows the relative placement of nut 100 such that impact is made on the shell, while not damaging the nut meat.

It is seen that both the arm and the base can be hollow or solid, though weighted for rigidity. It is also seen that the recess 50 contributes to clean lines, but its presence is optional as full operability is obtained by the use of an overlaid impact plate and an overlaid lower hinge half.

I claim:

1. A nutcracker comprising in combination
a top part and a bottom part hingedly connected to each other at one end of each,
said bottom part comprising an elongated base having a top surface and a bottom surface,
an upstanding stop mounted on the top surface thereof at the appropriate end of said base from the hinge,
a pair of spaced parallel rails extending rearwardly from said stop toward said hinge, and a separate nut receiving plate disposed between said rails.
said top part including a weighted arm having an impact plate adapted to impact a nut placed between the spaced parallel rails of said bottom part.

2. The nutcracker of claim 1 further including a shock absorber mounted on top of said stop and extending slightly upwardly therefrom.

3. The nutcracker of claim 1 further including an impact plate mounted on said arm and adapted to impact a nut and a nut receiving plate disposed between said rails.

4. The device of claim 1 wherein the base is mounted on rubber feet.

5. The nutcracker of claim 1 wherein the arm and base are made of wood.

6. The device of claim 1 transverse notches are set out on at least one of the impact plate and the nut receiving plate to prevent slippage of a nut.

7. In the nutcracker of claim 1 wherein the shock absorber is made of a resilient material 8. In the nutcracker of claim 7 wherein the shock absorber is mounted at an angle of about 8°.

9. A nutcracker having an elongated top part and an elongated bottom part, hingedly connected at one end of each to each other,
the bottom part having a base with an upper surface on which is mounted,
an upstanding stop secured to said top surface at the opposite end of said base from said hinge,
a shock absorber superposed on said stop, said absorber conforming to the cross-sectional configuration of said stop,
a pair of spaced parallel rails extending from said stop to said hinge secured to said upper surface of said base,
a nut receiving elongated plate disposed between said rails,
an elongated impact plate mounted on the surface of said top plate adapted to impact a nut placed between said rails.

10. The nutcracker of claim 9 wherein the arm and base both have a rounded front surface and the base is mounted on rubber feet.

* * * * *